Dec. 4, 1951     T. O. SNIDER     2,577,377
ACTUATOR FOR HOIST PIT CLOSURES

Filed Dec. 7, 1948     4 Sheets—Sheet 1

INVENTOR.
THEODORE O. SNIDER
BY
Woodling and Kroet
attys

Dec. 4, 1951 T. O. SNIDER 2,577,377
ACTUATOR FOR HOIST PIT CLOSURES
Filed Dec. 7, 1948 4 Sheets-Sheet 3

INVENTOR.
BY THEODORE O. SNIDER
Woodling and Kroet
attys

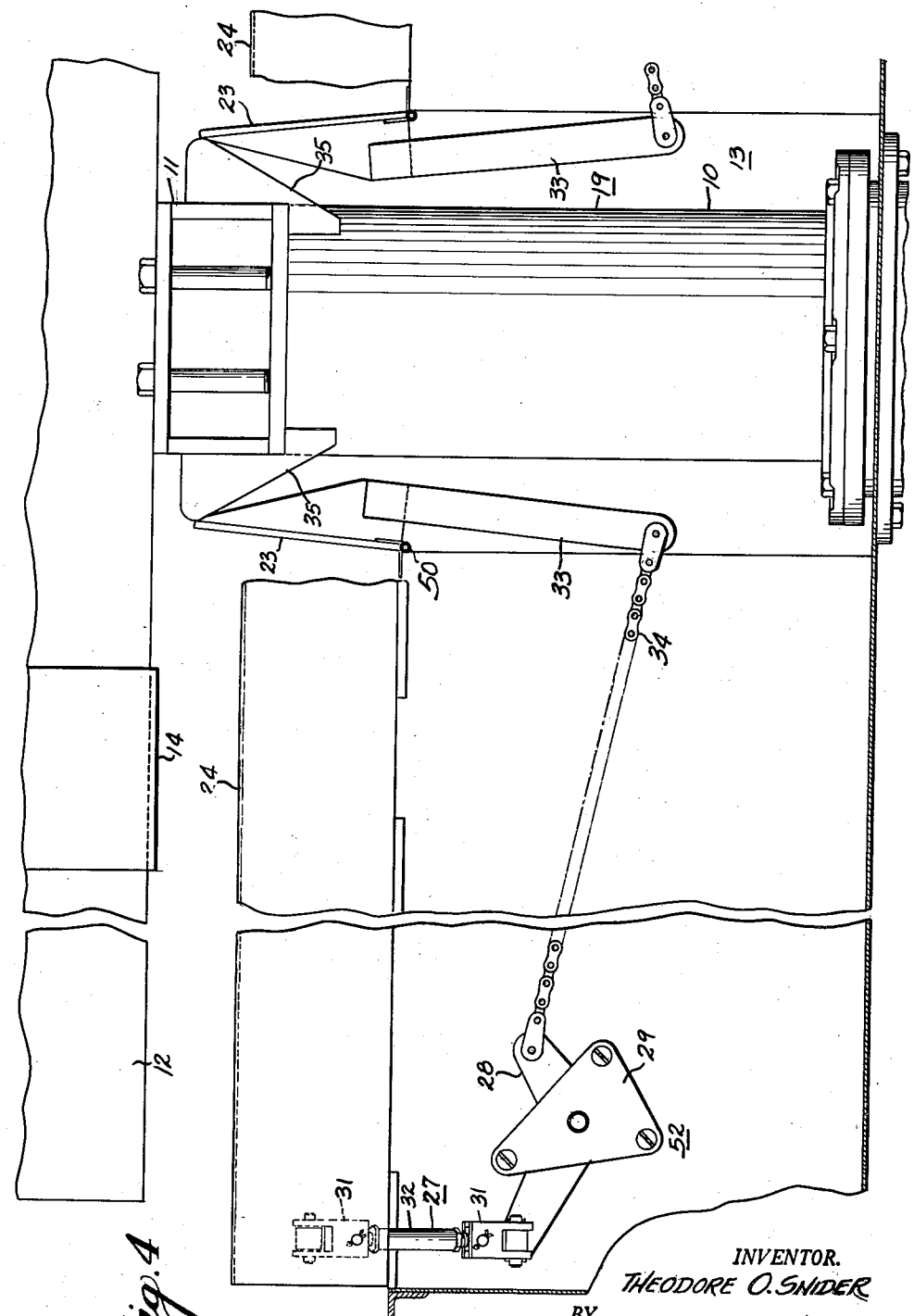

Patented Dec. 4, 1951

2,577,377

UNITED STATES PATENT OFFICE 2,577,377

ACTUATOR FOR HOIST PIT CLOSURES

Theodore O. Snider, Cleveland, Ohio, assignor, by mesne assignments, to Harold C. Schott, Cleveland, Ohio Application December 7, 1948, Serial No. 64,015

3 Claims. (Cl. 254—89)

This invention relates to automobile lifts in general, but relates more particularly to a lift which is retractable into a covered pit below floor level, and is related specifically to automatically controlled covers for a lift pit adapted to open and allow the superstructure of a lift to pass thereby and immediately close thereafter to cover the pit and provide useful floor area.

Prior automobile lifts generally consisted of a single hydraulic post and an H-shaped superstructure. The post operates in a cylinder extending into the floor of the service station or garage and the superstructure rests upon the floor. A vehicle to be lifted is driven upon the superstructure and then both the superstructure and the vehicle are lifted off of the floor by the hydraulic post.

Two-post lifts have been developed in which one post is adapted to contact the front axle of a vehicle, and a second post is adapted to contact the rear axle of a vehicle. Many advantages in automotive servicing and repair work are obtainable by two-post lifts. The automatically operated covers for a pit of this invention, into which the entire lift including the superstructure can withdraw and be covered, has made the two-post lift much more valuable. The large amount of floor space normally occupied by an automobile lift is available in the modern garage for other purposes when the lift is not being used. The space thus saved is equivalent to an entire supplemental garage in service stations and service garages having numerous lifts.

Therefore, an object of this invention is to provide an improved vehicle lift.

Another object of this invention is to provide a pit below floor level for a vehicle lift, and provide doors to cover the pit at all times except when the superstructure of the lift is passing in or out of the pit.

Another object of this invention is to provide automatically operable and closable doors for a lift pit.

Another object of this invention is to provide a lift pit having longitudinal and lateral doors covering the H-shaped superstructure of one post of a two-post lift; adapting the lateral doors to operate the longitudinal doors by lever linkage therebetween; and adapting the lift to operate the lateral doors.

A still further object of this invention is to adapt the lever linkage between the doors to transmit force in only one direction in order that the superstructure may push its way through the doors on its way up out of the pit, and the lateral doors open the longitudinal doors when the lift descends.

Other objects and a fuller understanding of this invention may be had by referring to the following description and claims, taken in conjunction with the accompanying drawing, in which:

Figure 1:
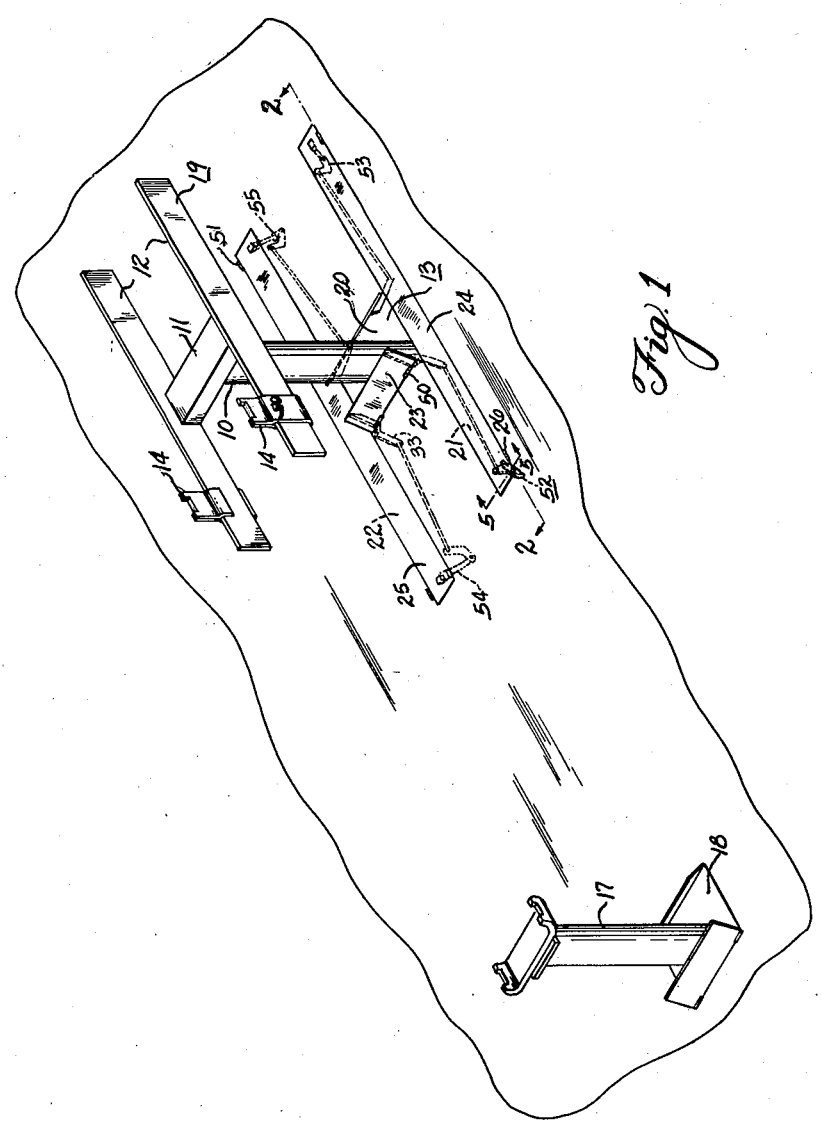
Figure 1 is a perspective view of a two-post lift which is retractable within a covered floor pit, the rear post being provided with the automatically operable doors of this invention.
Figure 2:
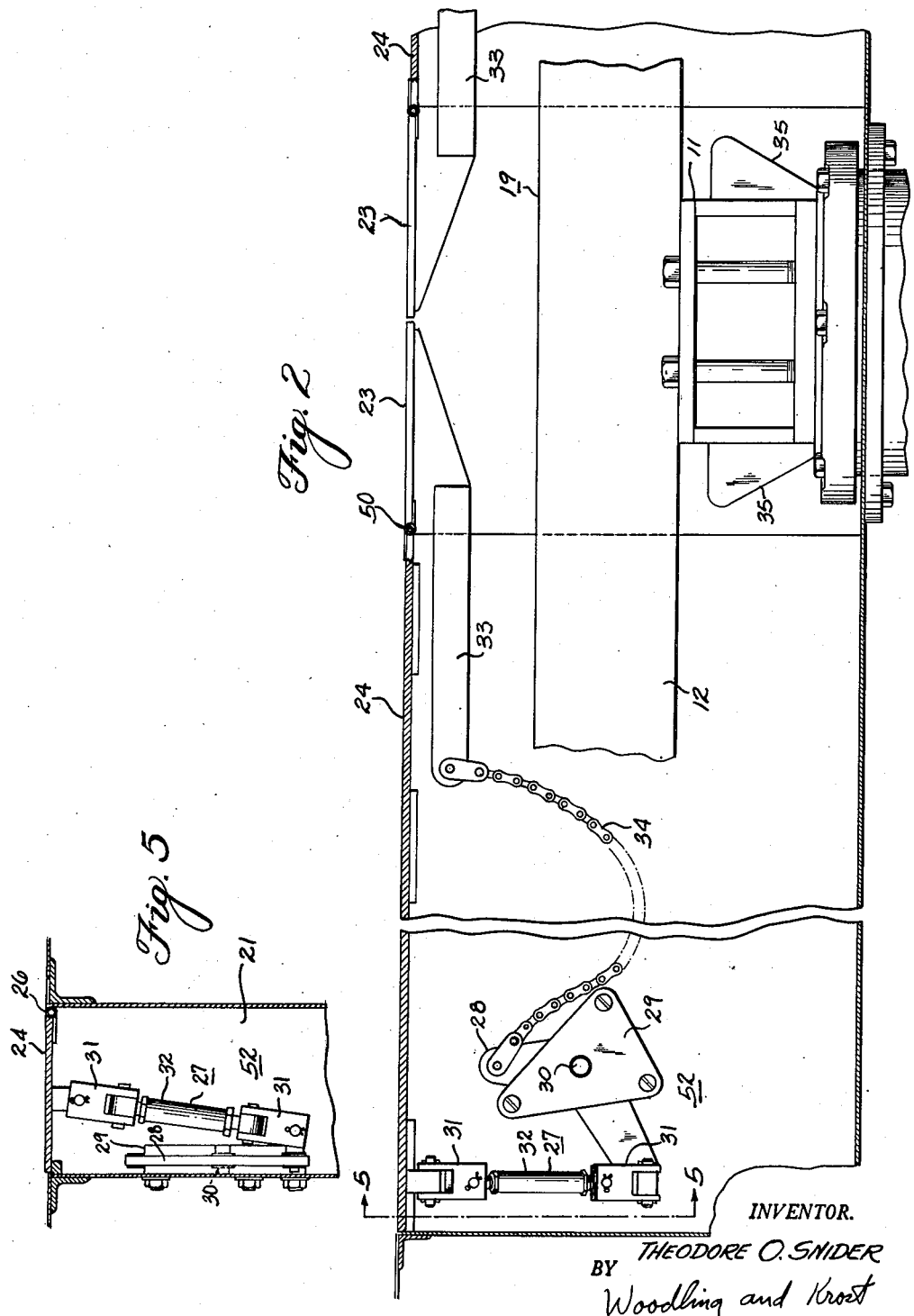
Figure 2 is a partial cross-sectional view taken from the position indicated by the line 2—2 of Figure 1, but with the lift entirely retracted into the pit and the doors being closed thereover.
Figure 3:
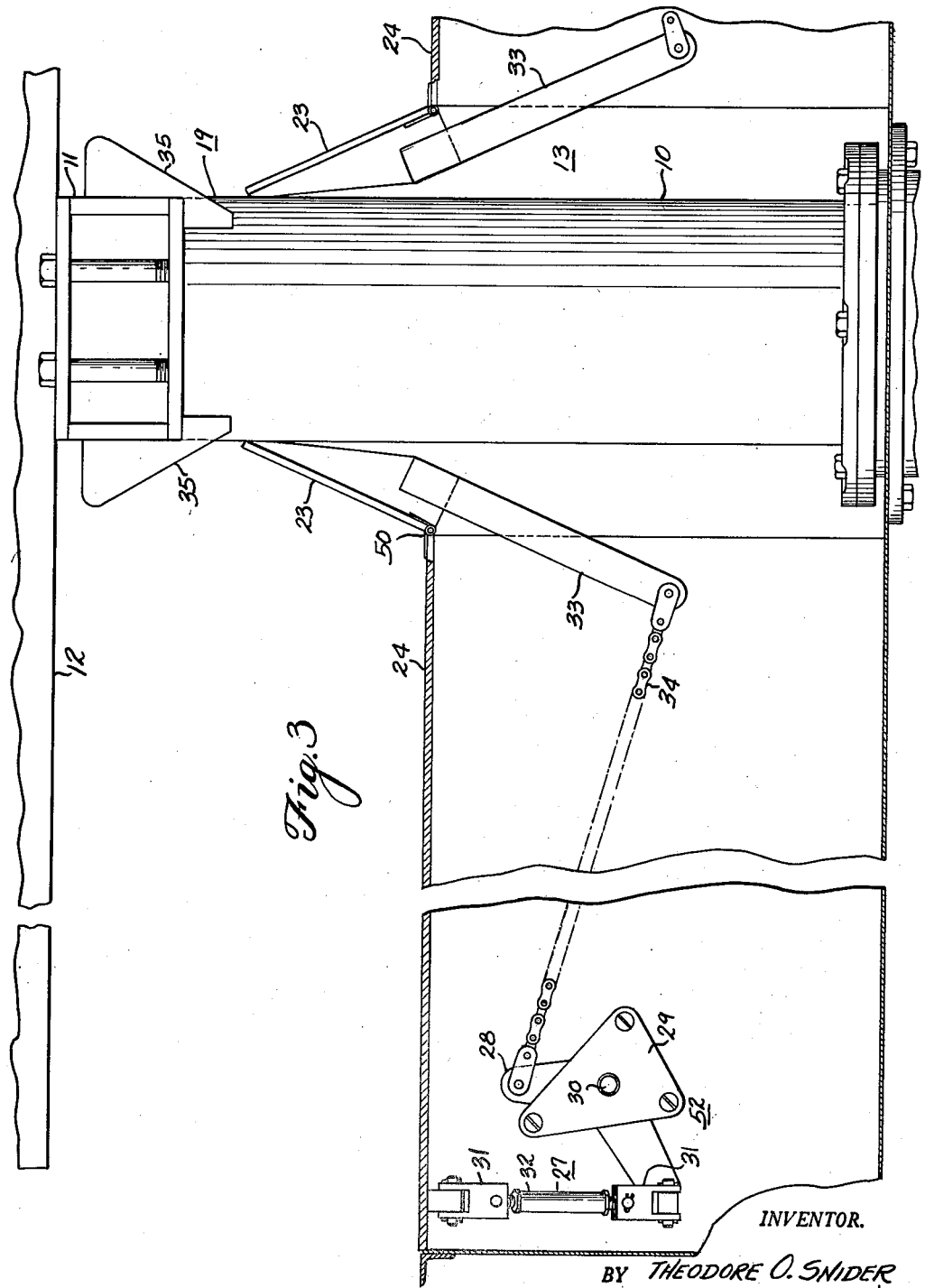
Figure 3 is a view similar to Figure 2, with the lift extended out of the lift pit.

Figure 4 is a view similar to Figures 2 and 3, with the lift at a position just prior to entering into the lift pit; and Figure 5 is a cross-sectional view through the pit substantially along line 5—5 of both Figures 1 and 2.

In the Figure 1 of the drawing the general plan of a two-post lift is illustrated having a front lift 17 of conventional construction adapted to withdraw into a pit 18, and a rear lift 19 adapted to withdraw into a lift pit 13. The principles of this invention, and an actual embodiment of the invention, are illustrated only in connection with the rear lift 19, because substantially all lifts provided for service stations and garages require only that the rear lift 19 has a long superstructure to compensate for the differences between the wheel bases of various makes and models of vehicles. The front lift 17 is therefore quite small and may be covered by any suitable type of door. The pit 18 is relatively small, and therefore great concern is not required as to whether the pit 18 is closed after the lift 17 extends therethrough. It is to be understood, of course, that the principles of this invention may very readily be applied to the front lift 17, but for the purpose of setting forth the invention herein, the front lift 17 and the pit 18 are not illustrated with the automatic doors of the present invention, but the invention is illustrated in the rear lift 19 and the pit 13.

The rear lift 19 comprises a hydraulic post 10 of suitable standard design and construction, having a cross member 11 bolted or otherwise suitably fastened on the end of the post. The Figures 1 and 2 best illustrate the position of two spaced, longitudinally extended, upright members 12 securely mounted on each end of the cross member 11. The cross member 11, and the members 12, constitute an H-shaped superstructure mounted on the end of the hydraulic post 10 for elevational movement to contact the undercarriage of a vehicle and lift the vehicle. The Figures 1 and 2 also illustrate two longitudinally shiftable axle-engaging blocks 14, one mounted on each of the longitudinal members 12, which may be longitudinally shifted by any suitable means upon the longitudinal members 12 to engage the axle of a vehicle parked over the lift pit 13. In other words, the vehicle is driven over the lift with the front axle thereof positioned over the front lift 17, and the rear axle is positioned over the superstructure of the rear lift 19. The axle-engaging blocks 14 are thereafter shifted, either by hand shifting or by improved remote control shifting, to a position below the rear axle of the vehicle. Thereafter, as the two posts of the lift are raised the axles of the vehicle will be accurately engaged and the vehicle will be lifted free of interfering lift structure.

As previously stated, the rear lift 19 is generally provided with a longitudinally extending superstructure in order that the two-post lift may accommodate vehicle wheel bases within a wide range of variation. Accordingly, in order to retract the large superstructure within a floor pit when the lift is not in service, relatively large floor openings are required. These large floor openings, if left uncovered, constitute a physical hazard for the service attendant, as well as a nuisance because of the fact that a dropped tool will invariably roll into an open pit.

In the Figure 1 of the drawings, a perspective view of the improved pit covering means of this invention is illustrated, and in the remaining views the details of construction and operation are set forth. The lift 19 is illustrated with an H-shaped superstructure, and the pit 13 is suitably formed with an H-shape to conform to the shape of the superstructure. The pit 13 includes a horizontal or cross pit 20, and two spaced longitudinally extending side pits 21 and 22. The horizontal pit 20 is adapted to be closed by two hinged doors 23 which are suitably mounted on the sides of the horizontal pit 20 by hinges 50 and meet in the center of the pit. Any suitable bracing means may be provided to support the doors 23 when they are in the closed position.

The side pits are provided with longitudinal door 24 on the pit 21 and door 25 on the pit 22. The door 24 is suitably hinged upon the side pit 21 by hinges 26 and door 25 is hinged by hinges 51, and are thereby adapted to swing open away from the horizontal pits 21 and 22.

In the usual lift structure, the spaced longitudinal members 12 are considerably less than the width of an automobile frame, and therefore the length of the horizontal pit 20 and the doors 23 is comparatively short. Therefore, the doors 23 are permitted to stand open in contact with the hydraulic post 10 when the lift 19 is extended out of the pit 13. In the Figure 3 of the drawing, the lift 19 is shown extended from the pit 13 with the doors 23 leaning against the post 10. In other words, as the rear lift 19 is extended from the pit, the doors 23 are opened by the lift 19 pushing the doors, and they are merely pushed open far enough to allow the cross member 11 and the post 10 to pass therethrough. The doors 23 constantly lie inwardly against the post 10 by gravitational force.

The doors 24 and 25 on the side pits 21 and 22 are also adapted to be contacted by the superstructure, namely by the longitudinal members 12, and pushed out of the way to allow the longitudinal members 12 to pass thereby. After the members 12 have passed by the doors 24 and 25, however, the doors 24 and 25 will fall back shut because there is nothing to hold them open. Figure 3 illustrates the closed position of the doors 24 and 25 after the lift 19 has extended up out of the pit 13, and the leaning position of the doors 23.

The doors 23, 24 and 25, as described, are very easily opened by the superstructure of the lift 19 pushing up against the underside of the doors when the lift is extended out of the pit 13, but the reverse procedure, that is, opening the doors for the lift 19 to descend downwardly past the doors into the pit 13 cannot be carried out in the same manner because the doors must be supported against downward movement to prevent an automobile or the weight of a person from opening the doors inwardly. The improved door-opening mechanism of this invention is employed to open the doors in advance of the superstructure of the lift 19 and permit the lift 19 to descend into the pit 13, and thereafter close the doors over the pit 13.

In Figure 1 of the drawings, the general layout of the illustrated embodiment of the invention includes a thrust arm assembly 52 at one end of the pit 21 and a thrust arm assembly 53 at the other end of the pit 21. Similar thrust arm assemblies 54 and 55 are spaced at the extreme ends of pit 22. Each thrust arm assembly is interconnected by means of a flexible linkage means 34 to an extension lever arm 33 on the doors 23, as illustrated. Each of the doors 24 and 25 are opened by the thrust arm assemblies at their extreme ends, and the thrust arm assemblies are actuated by the doors 23.

The operation of each thrust arm assembly is substantially the same, and therefore, in order to simplify the description of this embodiment of the invention, the description to follow will be limited principally to the structure and operation of thrust arm assembly 52 on door 24.

As best illustrated in Figure 5, the thrust arm assembly 52 includes an arm 27 and two spaced universal joints 31 connected by an intermediate arm 32. A bell crank lever 28, best illustrated in Figures 2, 3 and 4, is provided to extend and retract the arm 27 and operate the door 24. The bell crank lever 28 is suitably pivoted on the side of the pit 13 by means of pivot plate 29 and pivot pin 30. The arm 27 is thereby adapted to be flexible to interconnect between the moving end of the bell crank lever 28 and the swinging door 24, and yet remain sufficiently rigid to transmit force between the bell crank lever and the door.

In the Figures 2, 3 and 4 of the drawing, the doors 23 and extension lever arms 33 are shown as being swingable about the door hinges 50. The extension lever arms 33 extend in the direction opposite from the doors 23 down into the pit 13 as the doors 23 are swung open out away from the pit 13. The flexible linkage means, preferably a wire or chain 34, is used to interconnect the bell crank lever 28 and the extension lever arm 33. Thus, force may be transmitted from the extension lever arm 33 by rotating the door 23 about the hinge 50 thereof, but rotation of the bell crank lever 28 about the pivot pin 30 will not transmit force to the extension lever arm 33. That is, in the illustrated embodiment of the invention, the doors 23 are adapted to swing in only one direction, namely, upwardly away from the pit 13, and therefore the extension lever arm 33 is adapted to swing in only one direction, and that is into the pit 13. Likewise, because the bell crank lever 28 is securely fastened to the arm 27, and the arm 27 is fastened to the door 24 and thereby limited in its downward movement, the bell crank lever 28 is limited in its pivoting movement and cannot pull the chain 34 further than the position illustrated in Figure 2 of the drawing. On the other hand, the doors 24 and 25 may be opened while the doors 23 remain closed and will consequently move the arm 27 and pivot the bell crank lever, but no force will be transmitted by the chain 34 to the extension lever arm 33.

In the operation of a lift having a pit covered by the improved doors of this invention, the superstructure including the cross member 11 and the spaced longitudinal members 12 on the post 10 may be started upwardly in the conventional manner. The superstructure, as previously described, will contact the underside of the doors 23 and the doors 24 and 25, and thereby swing the doors open and push past the doors beyond the floor level above the pit 13. The doors 24 and 25 will fall shut upon the side pits 21 and 22 after the longitudinal members 12 have passed beyond contact with the doors 24 and 25. The doors 23, of course, will always lie in contact with the hydraulic post 10 and will thereby remain in the position substantially as illustrated in Figure 1 of the drawing while the hydraulic post 10 is extended out of the pit 13.

Cam members 35 are mounted near the top of the hydraulic post substantially in the position illustrated with relation to the longitudinally extending members 12. Therefore, as the superstructure is lowered toward the pit 13, the cam members 35 contact the doors 23 and move the doors 23 from the position illustrated in Figure 3 to the position illustrated in Figure 4. In the Figure 3, the chain 34 is illustrated extending between the bell crank lever 28 and the lever 33 with substantially no slack in the chain 34. This condition may be easily accomplished by adjusting the length of the chain 34. Because the chain is just long enough to extend between the bell crank lever 28 and the lever 33 when the doors 23 are in the position illustrated in Figure 3 against the side of the hydraulic post 10, the doors 23 and 24 remain closed. That is, no driving force is transmitted from the levers 33 to the bell crank lever 28. However, the cam member 35 is adapted to contact the doors 23 and swing them further around the hinges 50 and open the doors 23 to a position substantially as illustrated in the Figure 4. Because the chain 34 is just sufficiently long to extend between the bell crank lever 28 and the end of the lever 33 when the doors 23 are against the hydraulic post 10 and the doors 24 and 25 are in the closed position as illustrated in Figure 3, it therefore follows that the chain 34 will be pulled by movement of the lever 33 from the position illustrated in Figure 3 to the further open position illustrated in Figure 4, and therefore the chain 34 will pivot the bell crank lever 28 about the pivot pin 30 and force the arm 27 upwardly to open the doors 24 and 25. The longitudinal members 12 may then pass downwardly through the opened pits 21 and 22 into the retracted position. As the post 10 and the cams 35 pass downwardly, the doors 23 swing shut and allow the chain 34 to slacken, and the doors 24 and 25 to close.

In the upward movement of the post 10, the cams 35 will of course contact the doors 23 and swing them to the maximum open position. However, the longitudinal members 12 are positioned higher on the post 10 than the cams 35, and therefore the doors 24 and 25 will already be opened by the members 12. The lever arms 33 will swing when the cams 35 contact them and pull the chains 34, but the prior opening of the doors 24 and 25 by the members 12 will move the arms 27 and bell crank 28, and the chain 34 will therefore be slack and the lever arms 33 will not affect the operation of the doors 24 and 25.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a vehicle lift having a lift post with a superstructure thereon, said post and superstructure being adapted to lower into a pit below a floor surface, the provision of closure doors adapted to automatically open and permit the superstructure to pass thereby and automatically reclose thereafter comprising, first door means closing a portion of said pit over the area of said post, second door means closing the remainder of the pit, first lever means operated by said first door means, second lever means adapted to pivot and operate said second door means, linkage means to link said first and second lever means, said linkage means having a predetermined degree of slack, and cam means on said lift to operate said first door means and first lever means, said slack in the the linkage to the second lever means adapting said second door means to remain closed until the said cam means operates said first door means to a predetermined position.

2. In a vehicle lift having a lift post with a substantially H-shaped superstructure thereon, a pit having a substantially H shape to receive said superstructure below floor level, first door means hinged substantially at floor level to close the pit over the area of said post, second door means hinged substantially at floor level to cover the remainder of the pit, said first door means remaining open at all elevated positions of said lift in a leaning manner against said post, cam means carried by said lift to contact said first door means at one position of elevation of said lift and swing said first door means from said leaning position to an extended open position, and opening lever means for said second door means including linked drive means from said first door means operable to open said second door means by movement of said first door means from said leaning position to said extended open position.

3. In a vehicle lift having a lift post with a superstructure thereon, said post and superstructure being adapted to lower into a pit below a floor surface, the provision of closure doors adapted to automatically open and permit the superstructure to pass thereby and automatically reclose thereafter comprising, first hinged door means closing a portion of said pit over the area of said post, first lever means operated by said first door means, second hinged door means closing the remainder of said pit, second lever means adapted to pivot and open said second door means, said first and second hinged door means being hinged a distance laterally of the superstructure and being openable by contact of the superstructure on the bottom thereof as the superstructure moves upwardly out of said pit, said post and superstructure having a vertical contour from the top thereof downwardly acting as a cam track against which said first door means rests, said first door means when resting against said post being in a first open position, said contour including cam means protruding beyond said post, said first door means when resting against said cam means being in a second open position beyond said first position, flexible linkage means to link said first and second lever means, said flexible linkage means having a predetermined length greater than the distance between said first lever means in said first position and any position of said second lever means, said flexible linkage being shorter than the distance between said first lever means in said second open position and the closed position of said second lever means, said length of the flexible linkage means being equal to the distance between said first lever means in said second open position and the open position of said second lever means, thereby operating said second lever means to open said second hinged door means and permit the superstructure to pass thereby, said first door means and first lever means being adapted to fall shut to a closed position by gravity after the superstructure has passed downwardly thereby, said flexible linkage having a length greater than the distance between said first lever means in said closed position and said second lever means.

THEODORE O. SNIDER.

REFERENCES CITED

The following references are of record in the file of this patent:

UNITED STATES PATENTS

| Number | Name | Date |
| --- | --- | --- |
| 530,776 | Houser | Dec. 11, 1894 |
| 548,606 | Coe | Oct. 22, 1895 |
| 2,262,121 | Snider | Nov. 11, 1941 |
| 2,464,731 | Thompson | Mar. 15, 1949 |